United States Patent [19]

Gervasi

[11] Patent Number: 4,893,662
[45] Date of Patent: Jan. 16, 1990

[54] CUTTING TOOL

[76] Inventor: Vito Gervasi, 1888 Derby Dr., Oregon, Wis. 53575

[21] Appl. No.: 280,553

[22] Filed: Dec. 6, 1988

[51] Int. Cl.[4] .................. B27C 1/02; B27G 13/00
[52] U.S. Cl. ................. 144/230; 144/117 R; 144/221; 407/49; 407/63
[58] Field of Search ........... 144/114 R, 117 R, 117 A, 144/117 B, 130, 221, 230; 407/47, 49, 51, 60, 63

[56] References Cited

U.S. PATENT DOCUMENTS

| | | | |
|---|---|---|---|
| 1,438,184 | 12/1922 | Lewis | 407/49 |
| 2,771,108 | 11/1956 | Babunovic et al. | 144/221 |
| 2,969,816 | 1/1961 | Johnsa | 144/221 |
| 3,672,017 | 6/1972 | Nielsen et al. | 407/49 |
| 4,541,756 | 9/1985 | Kubota | 407/63 |

Primary Examiner—W. Donald Bray
Attorney, Agent, or Firm—Carl E. Gulbrandsen; James A. Gabala

[57] ABSTRACT

A cutting tool for a planer or similar machine is described. The tool comprises a flat blade having a straight cutting edge, a blade holder for holding said blade for rotation about an axis and means for locating said blade on said holder to have said blade present one cutting angle at one axial end and a different cutting angle at an opposite axial end, and to have the two opposite axial ends of the cutting edge of the blade located substantially at the same distance from the axis of rotation of the blade holder.

35 Claims, 3 Drawing Sheets

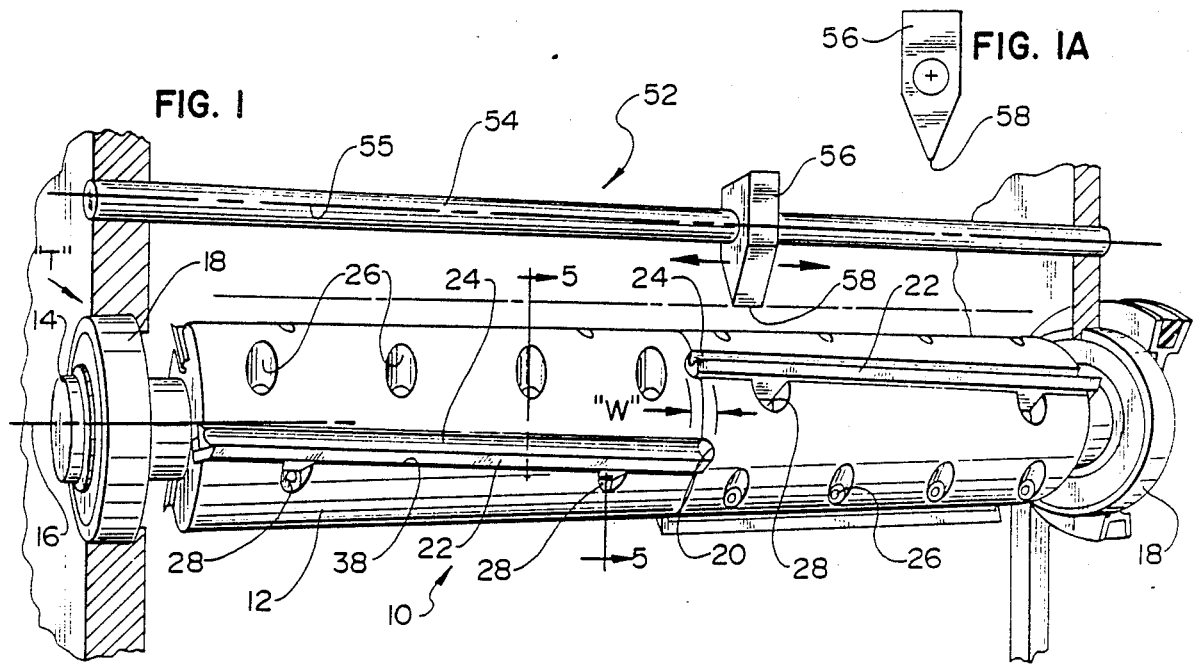
FIG. 1
FIG. 1A
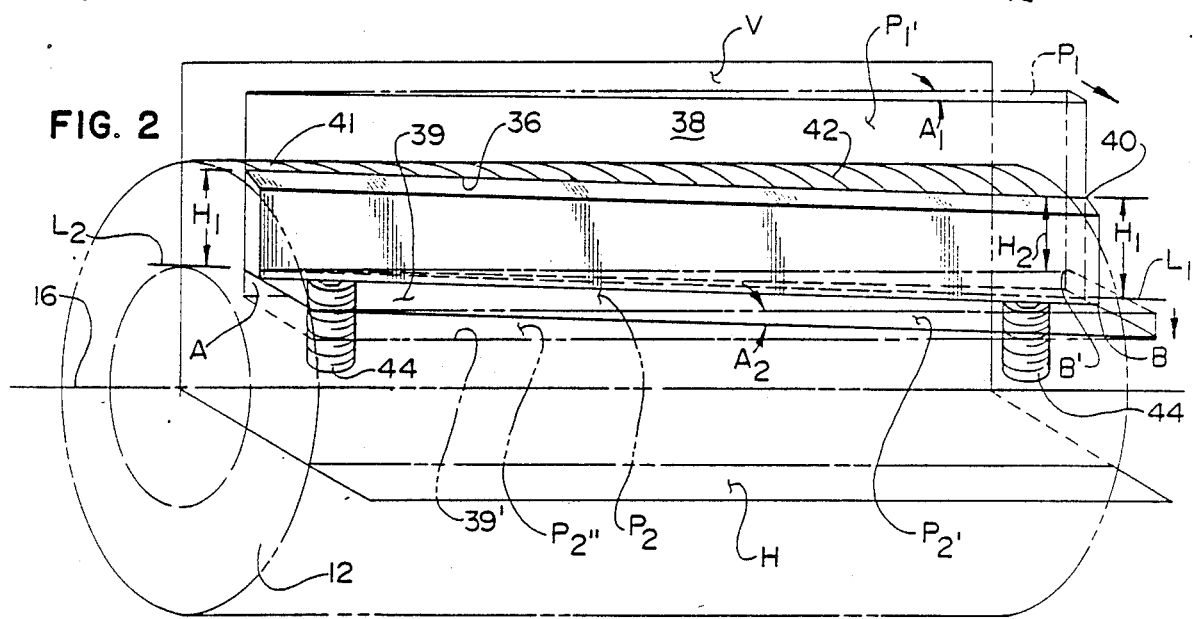
FIG. 2
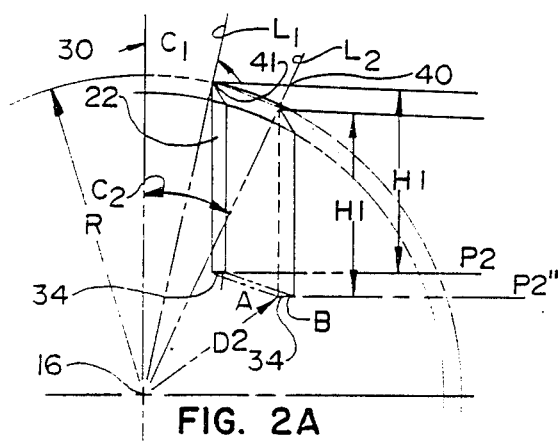
FIG. 2A
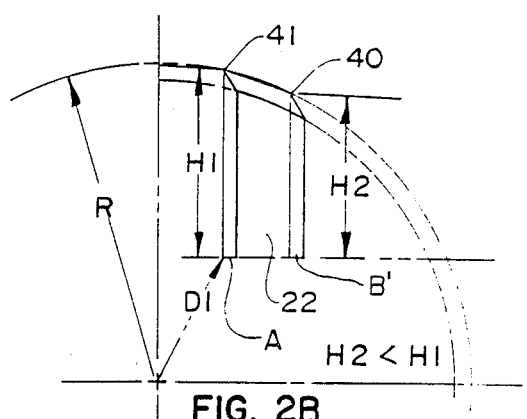
FIG. 2B

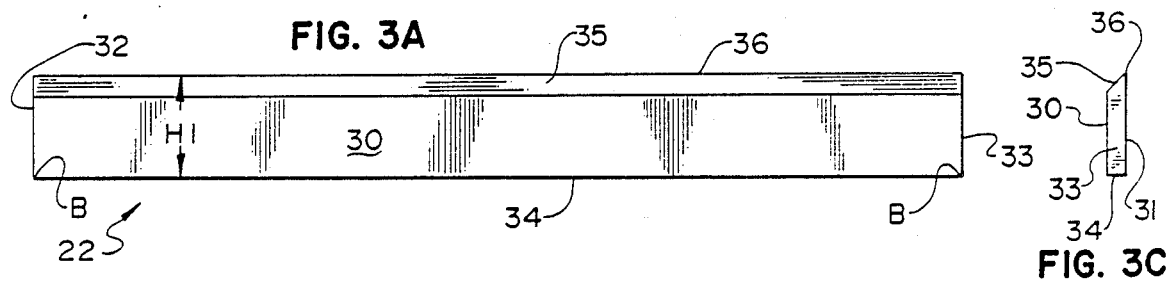
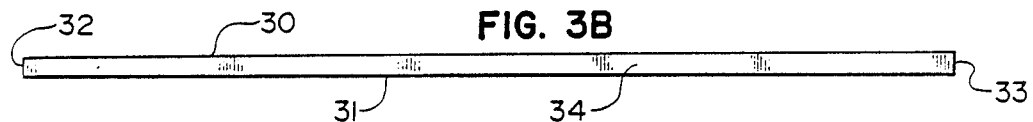
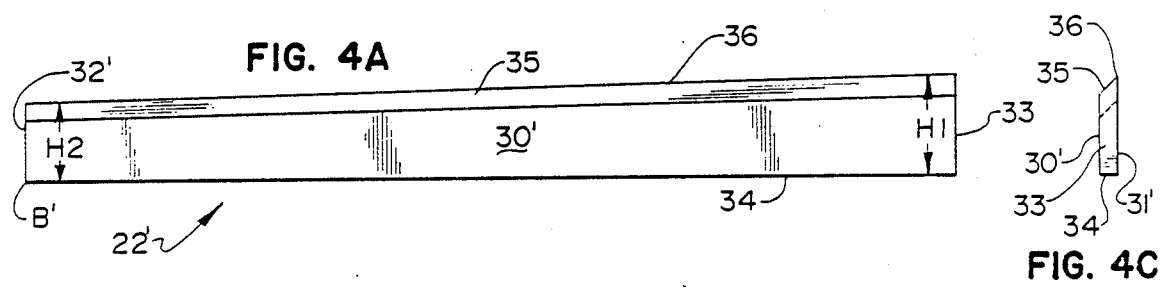
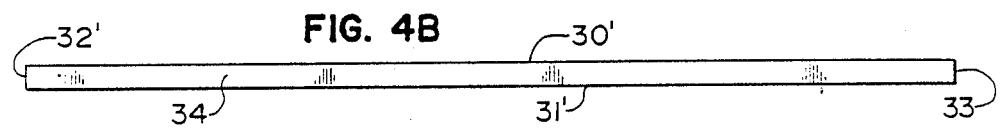
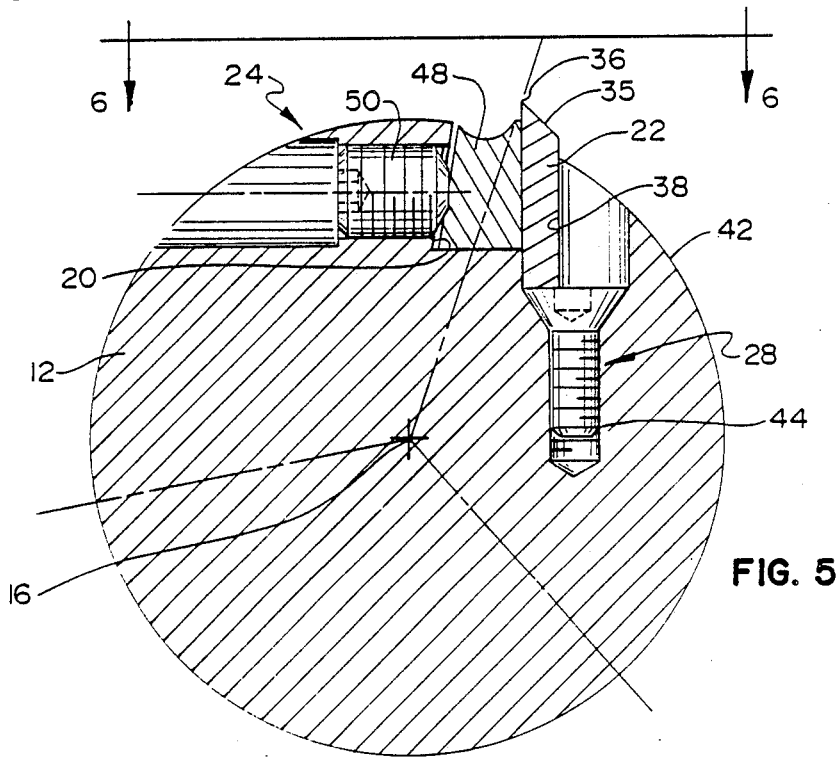

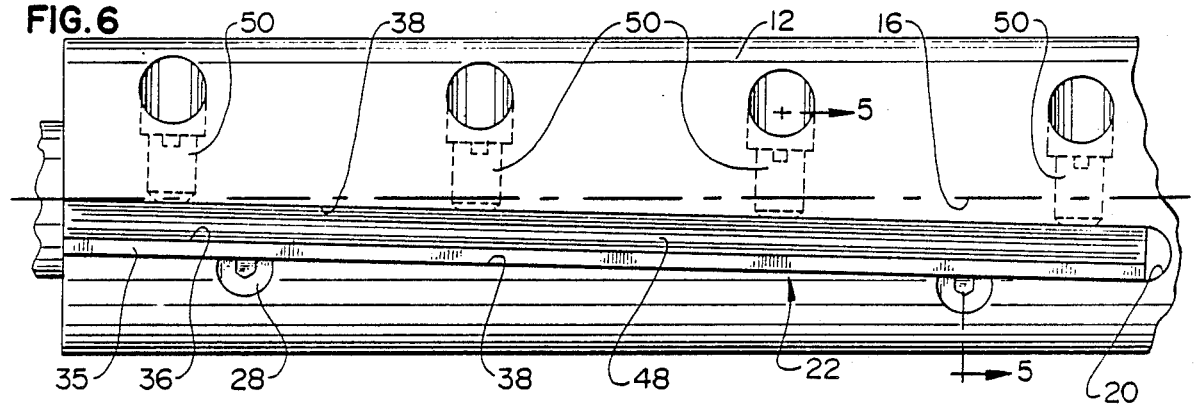
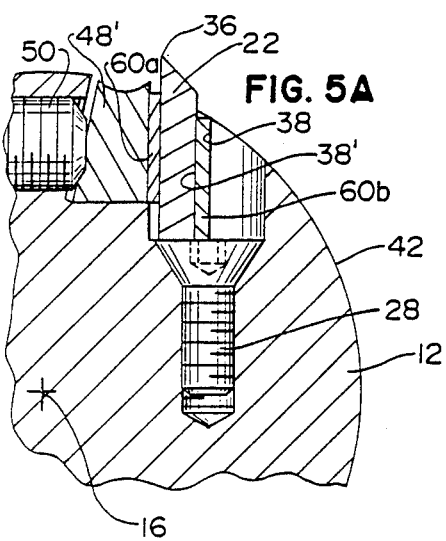
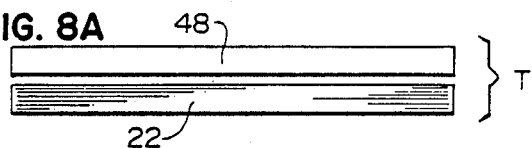
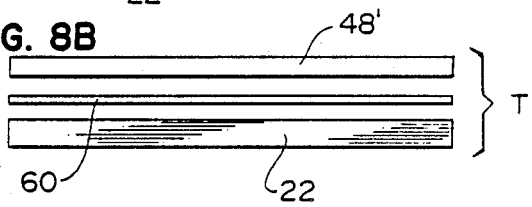
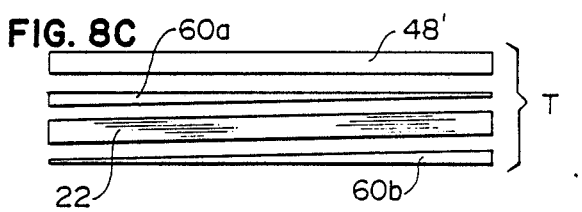
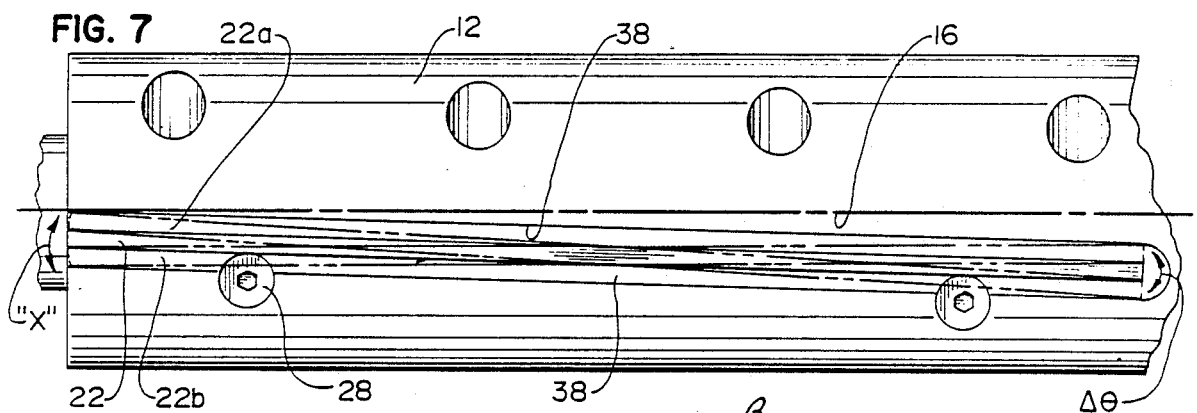
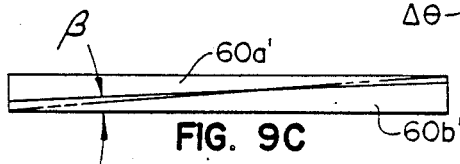
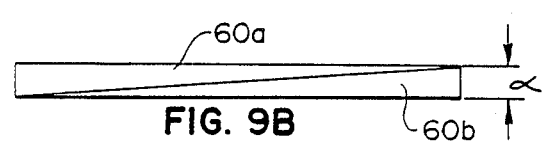
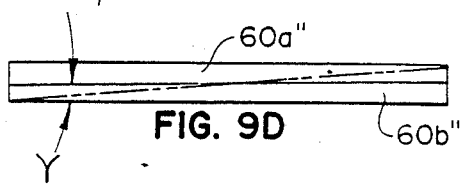

CUTTING TOOL

TECHNICAL FIELD

This invention relates to the general subject matter of cutting tools having rotating blades, and in particular, to planers and jointers which are used in the wood working art and to the cutterheads or devices which are used to hold the blades.

BACKGROUND OF THE INVENTION

The great bulk of hardwood lumber goes to some wood working plant where it is made into furniture, flooring, cabinets, or other products. Next to sawing, planing is by far the most important machining operation. Nearly every hardwood board is planed at some stage of its fabrication into a finished product.

The tip of such a machine employs a cutterhead in which a plurality of cutter blades are spaced around the periphery of the cutterhead with each blade aligned with the axis of rotation of the cutterhead. A typical example is described in U.S. Pat. No. 2,702,059.

In such a machine the entire cutting edge of each successive blades simultaneously engages the surface of the wood. Thus, there is a tendency for the rotating blades to "hammer" the workpiece resulting in excessive noise. Moreover, the blade becomes heated quite quickly which accelerates its becoming dull.

U.S. Pat. No. 2,969,816 describes an improvement wherein the cutterhead blades are angularly disposed relative to the axis of rotation. Because of the angular disposition of the blades, the cutting edges of the blades are convex in shape. The noise of the machine is reduced and the blades tend to stay sharper longer; however, a convex edged blade is not easy to keep sharp.

U.S. Pat. No. 4,541,756 describes an even more recent improvement in the art. There a blade is used having an elliptically curved cutting edge. Some manufacturers have gone a step further and used a cutterhead having helical cutting edges (i.e., like on a hand driven reel lawn mower) in order to effect smooth and silent machining.

Unfortunately, it is very difficult and expensive to manufacturer cutting blades having other than a flat, smooth, straight, cutting edge. When helical cutting edges, elliptical cutting edges, or convex edged blades are used, the blade is not only expensive to manufacture but more difficult to sharpen at the job site. The sharpening technique is not easy and often special purpose equipment is needed. The net result is the benefits of axially inclined cutting blades are not easily or practically achieved.

Another factor affecting the use of the cutterhead of a planer is its cutting angle. The cutting angle is the angle between the face the blade or cutting edge and a radial line. The importance of cutting angles as a factor in the quality of planing varies greatly among the species of wood. The oaks, for example, are not much affected and plane well through a wide range of angles. On the other hand, Hackberry and Willow may yield three or four times as many defect-free samples when an optimal cutting angle is used. A wood working plant that specializes in one product, such as oak flooring, has only one wood to consider and can easily adapt its practices to the particularities of that wood. However, a general planing mill, a custom wood working plant, or even the individual having a woodshop in his home, handles a wider variety of wood species. Since it is not practical to change knife angles every few hours with a change of species, one cutting angle is usually adopted that experience has shown to give the best results for a given set of conditions. As a rule, a 20 degree cutting angle is good if the species are hardwoods and a 30 degree cutting angle if good if softwoods are the chief raw material. Often the wood worker purchases at least two sets of cutterheads with each cutterhead having blades inclined in a different cutting angle. However, this is an expensive solution to the problem and one not often practical to the small woodshop.

If standard, straight edged, flat cutting blades could be used, if the these blades could be inserted into a cutterhead without excessive need for alignment if such a cutterhead could be incorporated in existing planer machines, and if the cutting angle could at the same time be optimized, productivity and quality would be improved at relatively little cost. Moreover, existing planer machines and woodshops would be given added utility.

What is needed is a cutterhead for planing machine which achieves the benefits of low noise and high quality without the expense of having to buy special purpose or especially shaped blades or a plurality of fixed angle cutterheads.

SUMMARY OF THE INVENTION

In accordance with the present invention, a cutterhead for a planer or similar device is disclosed comprising: a cylindrical drum having at least one elongated cavity along the periphery of the drum and having an axis of rotation; a straight edged, generally flat cutting blade having a leading edge defined by two flat intersecting planes; and means for removably holding and positioning that blade in the cavity of the drum with the leading edge or cutting edge of the blade projecting beyond the periphery of the drum at generally the same distance from the axis of the drum and with the leading edge of the blade inclined along a line defined by two intersecting planes which are at acute angles to two intersecting planes which defining the axis of the drum, whereby the leading edge of the blade is inclined at one predetermined cutting angle at one end of the blade and inclined at a second predetermined cutting angle at the opposite end of the blade.

Preferably, the cavity has an outwardly converging at its periphery. Preferably, the drum is provided with alignment means for aligning the blade relative to the outer surface of the drum so that one end of the cutting edge of the blade is located substantially at the same distance from the axis of the drum as an opposite end. Preferably, the cutting angles are optimized for a particular wood to be planed, or a family of hardwoods, for example.

In addition to permitting one to use ordinary, straight edge cutting blades which can be easily sharpened and acquired at low cost, there is the advantage of low noise. Low noise is achieved because only a small portion of the leading edge of the blade contacts the work piece. Other advantages and features of the present invention will become readily apparent from the following detailed description of the invention, the embodiment described therein, from the claims, and from the accompanying drawings.

BRIEF DESCRIPTION OF THE DRAWINGS

FIG. 1 is a side elevational view of a rotatory cutterhead and alignment tool that is the subject of the present invention;

FIG 1A is a side view of the alignment block of FIG. 1.

FIG. 2 is a schematic perspective view showing the manner in which the cutterhead blade is aligned or positioned relative to the axis of rotation of the cutterhead;

FIGS. 2A and 2B are partial end views of the blades of FIGS. 3A and 4A in the geometry of FIG. 2;

FIGS. 3A, 3B, 3C and 4A, 4B, and 4C are front elevational, bottom, and side views of straight edged cutter blades that may be used with the present invention; and FIG. 5 is a partial cross-sectional end view of the cutterhead of FIG. 1, as viewed along line 5—5; and FIG. 5A illustrates a modification to the structure of FIG. 1;

FIG. 6 is a partial enlarged view of the top of the cutter head as viewed along line 6—6 of FIG. 5;

FIG. 7 is a representation of the manner in which the blade of FIG. 6 can be moved in the cutterhead slot to affect the cutting angle of the blade; and FIGS. 8A, 8B, 8C, and FIGS. 9A, 9B, 9C and 9D are depictions of the manner in which shims may be used to produce the effect illustrated in FIG. 7.

DETAILED DESCRIPTION OF THE PREFERRED EMBODIMENT

While this invention is susceptible of embodiment in many different forms, there is shown in the drawings and will herein be described in detail one specific embodiment of the invention. It should be understood, however, that the present disclosure is to be considered as an exemplification of the principles of the invention and is not intended to limit the invention to the specific embodiments illustrated.

It should be understood that, although the following description is presented in the context of a wood planer, the invention is not to be so limited. The basic concept of the invention is equally applicable to milling machines and the like.

Turning to FIG. 1, the cutterhead 10 that is the subject of the present invention comprises a right cylindrical body drum 12. A drum rotating shaft 14 is keyed into the bore of the body drum 12 to provide rotation about an axis 16 of revolution. As is the usual case, the shaft 14 is carried by end ball bearings 18 and is driven by a motor (not shown). The axis 16 of rotation of the cutterhead 10 is arranged to be perpendicular or normal to the path of travel (arrow "T") of the wooden work piece fed to the cutterhead.

Recessed in the outer periphery of the drum 12 is a set of or a plurality of evenly spaced blade receiving cavities. Each cavity 20 is elongated and inclined at a small acute angle of about 2 to 4 degrees relative to a plane containing the axis 16 of the shaft 14. As will later be described in detail, each cavity 20 has associated with it a blade 22, a gib or wedging means 24 for substantially filling each cavity, a plurality of threaded fasteners 26 for holding the wedging means and the blade in placed within the cavity, and adjustable means 28 for aligning the position of the cutting edge of the blade 22 relative to the axis 16 of rotation of the shaft 14. It should be noted that adjacent inner ends (i.e., those at the center of the drum 12, see arrow "W") of each set of blades 22 slightly overlap each other. In one embodiment of the invention, the drum has an outer diameter of approximately 2 ¼ inches, and the cavities have a width of ⅜ of an inch and a length of 6 3/16 inches. The shaft is preferably driven to produce approximately 13,500 cuts per minute.

One important aspect of the present invention is that ordinary, flat, straight edged blades may be used while inclined at an angle to the axis 16 of rotation of the drum 2. A typical, commercial, readily available blade 22 is shown in FIGS. 3, 3A, and 3B. Such a blade 22 has two flat long sides 30 and 31, two end walls 32 and 33 at each end of the blade, a bottom 34, and a long bevelled edge wall 35 defined by a plane which is at an angle to the two long sides. The bevelled edged wall 35 and one long wall 31 define the cutting edge 36 of the blade. It is approximately 6 ⅛ inches long and ⅛ inch thick.

Turning now to FIG. 2, the unique geometric arrangement of the cutting edge 36 of each blade 22 will now be described. It should be understood that the dimensions and angles in FIG. 2 have been exaggerated somewhat to emphasize the physical relationships and the principles of the invention. The axis 16 of the drum 12 is defined by two flat planes "H" and "V" which intersect each other along a straight line. If two planes P1 and P2, parallel to the planes defining the axis 16, and offset from them are then rotated through small acute angles A1 (i.e., outwardly) and A2 (i.e., downwardly), a straight line L1-L2 is defined which is inclined to the axis 16 of the drum 12. Each cavity 20 has a flat generally elongated wall 38 which lies in a plane P1' which is inclined at an acute angle relative to a plane containing the axis 16 of the drum 12. It is against this wall 38 (i.e., plane P1') that one long flat side 31 of the blade 22 is positioned and held by the wedging means 24. The cutting edge 36 of the blade 22 is then positioned on this wall 38, relative to axis 16 of the drum 12, such that two opposite ends 40 and 41 of the cutting edge 36 are positioned substantially at the same distance "R" from the axis of the shaft (see FIG. 2A). For a rectangular blade, the bottom would be along plane P2'.

One effect of this arrangement is the two opposite ends 40 and 41 of the cutting edge 36 of each blade 22 form two different cutting angles C1 and C2. The cutting angle is the angle between the face or side 30 of the blade 22 which form the cutting edge 36 and a radial line "L1" or "L2". Preferably, the two ends 40 and 41 of the blade 22 are offset at an acute angle relative to each other such that one end 41 of the blade defines a cutting angle of 15 degrees, while the other end 40 of the blade defines a cutting angle of 25 degrees. The cutting angle could be optimized for one particular wood (i.e., Magnolia: 5 to 15 degrees) or optimized for a family of hardwoods (i.e., Red Oak, White Oak: 10 to 15 degrees). Unlike prior devices, the user is not forced to select or be satisified with one cutting angle. Since wood planing is affected by moisture content, for example, the range of cutting angles offered by the present invention improves the utility and versatility of the planer and the likelihood that more defect free pieces will result.

As seen from FIGS. 2 and 2A, another effect of so positioning the cutting edge 36 of the blade 22 (see FIG. 3A) is that one end "B" of the bottom 34 of a rectangular blade is disposed at a greater distance D2 from the axis 16 of the shaft than the opposite corresponding bottom end "A" of the blade. This would necessitate a cavity having a similarly shaped bottom 39 (i.e., in the plane of P2'). The bottom 39 of the cavity can be generally at right angles to the cavity wall 38 on which the blade rests, if the blade is modified (see FIG. 4) to have a generally trapezoidal shape. The cavity bottom 39 would then lie along plane P2, for example.

Alternately, a rectangular blade, such as that shown in FIG. 3, can be used if an adjustable means 28 (i.e., set screws 44) is used to position two opposite bottom ends of the blade to take in account this offset. In such a case the bottom 39' of the cavity would lie in a plane (i.e., plane P2") which is parallel to a plane containing the axis 16 of the shaft. One advantage using a separate adjustable means 28 is that minor variations in blade dimensions can be compensated for. As the blade becomes worn, some adjustment will be needed. Another advantage of using an adjustable means is that the bottom of the cavity can be machined more easily.

Turning now to FIG. 5, one form of the wedging means 24 and adjustable means 28 will now be described. Each cavity has a cross-section which is wider at the interior than along the periphery of the drums surface 42. The opposite ends 40 and 41 of the cutting edge 36 of each blade 22 are moved inwardly and outwardly relative to the surface 42 of the drum 12 by means of two set screws 44. The wedging means 24 comprises gibs 48 which are forced against the blade 22 and the long wall 38 of the cavity 20 by means of four holding set screws 50.

The position of the opposite ends 40 and 41 of the cutting edge 36 of the blade 22 is preferably determined by alignment means 52 comprising a bar 54 whose axis 55 is parallel to the axis 16 of the drive shaft 14 (see FIGS. 1 and 1A) and a block 56 which is slidingly disposed on the bar. The block 56 has a pointed alignment end 58. The axial positions of the two opposite ends 40 and 41 of the cutting edge 36 or leading edge of the blade 22 are then determined by adjusting the alignment set screws 44 until the cutting edge of the blade comes into contact with the pointed end 58 of the block 56 when that block is axially positioned at two opposite ends of the blade and the drum is rotated to bring the cutting edge in registry. After the cutting edge 36 of the blade 22 is so positioned, the holding set screws 50 may be then tightened to securely hold the blade in place.

Turning to FIG. 6, the relative position of the blade 22, the gib 48, and the two long walls 38 of the cavity 20 are illustrated. As previously explained, the two opposite long walls 38 forming the cavity or slot 20 are formed into the drum 12. Once the inclination of the walls 38 relative to the axis 16 of the drum is established, the relative position of the blade 22 is fixed and the cutting angles C1 and C2 of the blade (See FIGS. 2 and 2A) are established.

However, changing the position of the blade 22, 22' and 22" relative to the cavity walls 38 (See arrow "X" in FIG. 7) affects the cutting angle defined by the blade along its length. Since it is somewhat impractical, from a cost point-of-view, to have a set of cutterheads having cavities inclined to cover a wide range of acute angles, and since optimum cutting angles variety (e.g., depending upon the wood to be planed), it would be desirable to change the cutting angles presented by the blade without having to use different body drums 12.

Turning now to FIG. 8A, there is schematically depicted a blade 22 and a gib 48 which together define a thickness "T" generally equal to the width of cavity 20. In FIG. 8B, the same blade is used in combination with shimming means 60 which is generally rectangular in shape and of uniform thickness throughout. Together, the blade 22, the gib 48, and the shimming means 60 have a thickness "T" equal to the width of the cavity 20. In FIG. 8C, there is illustrated a shimming means formed from two generally wedge-shaped members 60a and 60b (See FIG. 9A) which are positioned on either side of the blade 22. Together, the blade 22, the gib 48', and the two members 60a and 60b define a thickness "T" generally equal to the width of the cavity 20 FIG. 5A is a partial, cross-sectional, side elevational view similar to that of FIG. 5, with the shims 60a and 60b and the gib 48' installed as depicted in FIG. 8C. However, by virtue of the wedge-shaped shims 60a and 60b, the position of the blade 22 has been changed relative to the fixed long walls 38 of the cavity. Accordingly, the cutting angles defined by the blade 22 along its length have been changed by an incremental amount. Shimming members 60a and 60b can be provided in a range of angles (See FIGS. 9B, 9C, and 9D), whereby the relative position of the blade 22 can be changed within a narrow range and the cutting angles varied. Thus, the modification to the cutterhead afforded by the use of the shimming means adds greater utility to the invention beyond that afforded by the unique manner in which ordinary rectangular blades are used.

From the foregoing description, it will be observed that numerous variations and modifications may be affected without departing from the true spirit and scope of the novel concept of the invention. For example, even though two sets of evenly spaced blades are illustrated in FIG. 1, a single set of blades or even one blade positioned in accordance with the present invention may be used. Moreover, it should be understood that cavities, as such, need not be provided if other holding means are used, such as threaded fasteners passing directly through apertures in the blade. It is, of course, intended to cover by the appended claims all such modifications as fall within the scope of the claims.

I claim:
1. In a wood planer, apparatus comprising:
    (a) a generally cylindrical cutterhead having an axis of revolution, an outer surface and at least one generally elongated slot in said surface, said slot having a bottom and one long wall joined to said bottom, said one long wall of said slot being defined by a flat plane which is inclined at acute angle relative to a flat plane which contains said axis;
    (b) a flat cutting blade adapted to fit within said slot and against said one long wall, said blade having two parallel spaced apart flat sides, a flat base between said sides, two opposite ends which are generally perpendicular to said base and said sides, and a straight flat bevelled cutting edge which is located opposite to said base; and
    (c) alignment and holding means, carried by said cutterhead, for holding said blade in said cutterhead against said one long wall of said slot and for aligning said blade relative to said outer surface to have one end of said cutting edge present a first predetermined cutting angle and an opposite end of said cutting edge present a second predetermined cutting angle which is greater than said first predetermined cutting angle and to have said one end of said cutting edge located substantially at the same distance from said axis as said opposite end of said cutting edge, said first and second angle being selected to optimize the planing of a family of hardwoods or one species of hardwood.

2. The apparatus of claim 1, wherein said first predetermined angle is approximately fifteen degrees.

3. The apparatus of claim 1, wherein said second predetermined angle is approximately twenty-five degrees.

4. The apparatus of claim 1, wherein said slot has a bottom which lies in a flat plane which is parallel to a flat plane containing said axis; and said alignment and holding means comprises adjustable means, threaded into said cutterhead at opposite ends of said bottom of said slot and engaging said base of said cutting blade, for raising and lowering said one end of said cutting edge and said opposite end of said cutting edge relative to said surface of said head.

5. The apparatus of claim 1, wherein said slot has a cross section that is wider at the interior of the head than at the outer surface of said head; and wherein said alignment and holding means comprises wedge means, fitting together with said blade, for substantially filling said slot such that said blade and said wedge means have substantially the same cross section as said slot.

6. The apparatus of claim 5, wherein said alignment and holding means further comprises threaded means for holding said wedge means and said blade in said slot.

7. The apparatus of claim 1, further including means, carried by the planer, for establishing the radial position of said one end and said opposite end of said cutting edge, such that said one end of said cutting edge is located substantially at the same distance from said axis as said opposite end of said cutting edge 8. The apparatus of claim 1, wherein said blade is generally rectangular and has a straight flat base which is parallel to said cutting edge.

9. The apparatus of claim 1, further including angle changing means, disposed between at least one of said sides of said blade and at least one of said alignment and holding means and said long wall of said slot, for changing said first predetermined cutting angle and said second predetermined cutting angle by at least a predetermined increment.

10. The apparatus of claim 5, further including angle changing means, disposed between one flat side of said blade and said wedging means and between the other flat side of said blade and said long wall of said slot, for changing said first predetermined cutting angle and said second predetermined cutting angle by a predetermined increment.

11. In a wood planer, apparatus comprising:
(a) a generally cylindrical cutterhead having an axis of revolution, an outer surface and a plurality of evenly spaced generally rectangular slots in said surface, the axis of each slot being inclined at an acute angle to a first flat plane containing said axis of revolution, said slots having two long generally flat interior walls which are inclined at said acute angle and a bottom wall which together define an outwardly converging cross section that is wider at the interior of said cutterhead than at the outer surface of said cutterhead, said bottom wall being generally parallel to a second flat plane containing said axis of revolution;
(b) a flat cutting blade for each slot, each blade having two parallel spaced apart flat sides, a flat straight base between said sides, two opposite flat ends joined to said base and said sides, and a straight flat bevelled cutting edge which is located opposite said base;
(c) filling means, fitting together with each blade, for substantially filling each slot;
(d) alignment means, carried by said cutterhead adjacent said bottom of each slot, for aligning its blade relative to said outer surface to have one end of the cutting edge of its blade present a first predetermined cutting angle of approximately fifteen degrees and an opposite end of the cutting edge of its blade present a second predetermined cutting angle of approximately twenty-five degrees and to have said one end of said cutting edge located substantially at the same distance from said axis of revolution as said opposite end of said cutting edge, said alignment means comprising adjustable means threaded into said cutterhead at opposite ends of said bottom of each slot for raising and lowering the base of its blade relative to said outer surface of said cutterhead;
(e) means, carried by the planer, for establishing the radial position of said one end and said opposite end of said cutting edge of each blade, such that one end of the cutting edge of each blade is located substantially at the same distance from said axis of revolution as the opposite end of the cutting edge; and
(f) threaded means, carried by said cutterhead adjacent each slot, for holding said filling means and its blade in that slot.

12. The apparatus of claim 11, wherein said cutting edge is not parallel to said base of said blade.

13. The apparatus of claim 11, wherein said filling means comprises: a gib for each slot which is located adjacent one of said long walls; and means, on at least one side of said blade, for changing the position of said blade relative to at least one such of said long walls of said slot such that said first predetermined cutting angle is increased and said second predetermined cutting angle is increased.

14. A planer, comprising:
(a) a cutterhead having an axis of rotation and at least one axially inclined cavity; and
(b) straight edged blade means having two flat generally parallel sides, a bottom end which is generally flat and which is perpendicular to said sides and a generally flat bevelled upper surface which is disposed between said sides, one of said sides and said bevelled surface defining a straight cutting edge; and
(c) holding means, carried by said cutterhead, for holding said blade means in said cavity of said cutterhead to have said sides of said blade at an acute angle relative to a plane containing said axis of rotation, to have one end of said cutting edge at a first predetermined cutting angle and an opposite end of said cutting edge at a second predetermined cutting angle, and to have said one end located at generally the same distance from said axis of rotation as said opposite end, said first and second cutting angles being selected to optimize the planing of a family of hardwoods or a species of hardwood.

15. The cutterhead of claim 14, further including:
(d) means, at opposite ends of said cavity for adjusting the position of the leading edge relative to said axis of rotation, such that one end the of leading edge of the blade projects at approximately the same distance from said axis of said drum as an opposite end of the leading edge of the blade.

16. A cutterhead adapted to use a generally flat cutting blade having a straight leading edge defined by two flat intersecting plane, comprising:
 (a) a drum having at least one elongated cavity along the periphery of said drum and having an axis of rotation; and
 (b) means for removably holding one blade in said cavity of said drum to have opposite ends of the straight leading edge project beyond said periphery of said drum at generally the same distance from said axis, and to have the leading edge lie along an intersection of two flat planes which are inclined at acute angles to said axis of rotation, and to have said leading edge present a range of cutting angles which are selected to optimize the planing of a range of hardwoods or species of hardwood.

17. The cutterhead of claim 16, wherein said elongated cavity has one long flat blade wall which lies in a plane which is inclined at an acute angle to a reference plane containing said axis of rotation and has a bottom wall which lies in a plane which is parallel to said reference plane.

18. The cutterhead of claim 16, wherein said blades have a base which is substantially parallel to said leading edge.

19. A method of using a straight edged planer blade to reduce noise and improve wood working quality for a range of hardwoods, comprising the steps of:
 (a) locating in a generally cylindrical drum a plurality of straight edged cutting blades in at least two rows at each end of the drum with each blade in each row offset from the blades in the other rows and with adjacent ends of each blade row overlapping each other;
 (b) positioning the cutting edge of each blade along a line defined by two mutually perpendicular planes which are inclined at an angle relative to the axis of rotation of the cutterhead such that one end of the blade is inclined at a first predetermined cutting angle of approximately 15 degrees and the opposite end of the blade is inclined at a cutting angle of 25 degrees; and
 (c) fixing the height of said blade relative to said drum such that said one end is approximately at the same distance from the axis of said cutterhead as said opposite end.

20. The method of claim 19, wherein step (a) includes the step of establishing in said drum a plurality of axially inclined cavities for each blade, each cavity having at least one elongated flat wall which is open to the exterior of said drum; and wherein step (b) includes the step of inserting at least one wedge-shaped shim between said flat wall and said blade, such that one of said two perpendicular planes is established.

21. A planer cutting tool, comprising:
 (a) a generally cylindrical cutterhead having an axis of revolution, an outer surface and at least one elongated slot in said surface;
 (b) a flat cutting blade adapted to fit within said slot, said blade having two parallel spaced apart long flat sides, a flat straight base between said long sides, two opposite flat ends which are joined to said base and said sides, and a straight flat bevelled cutting edge which is at an angle to said base; and
 (c) alignment and holding means, carried by said cutterhead, for holding said blade in said slot and aligning said blade relative to said outer surface to have one end of said cutting edge present a first predetermined cutting angle and the opposite end of said cutting edge present a second predetermined cutting angle which is greater than said first predetermined cutting angle and to have said one end located substantially at the same distance from said axis as said opposite end.

22. The tool of claim 21, wherein said blade abuts a wall in said slot which lies in a plane which is at an acute angle relative to a plane containing said axis; and wherein said first and second cutting angles being selected to provide substantially defect free planed wood for a range of hardwoods.

23. The tool of claim 21, wherein said slot has a flat bottom which lies in a plane which is parallel to a plane containing said axis of revolution.

24. The tool of claim 21, wherein said slot defines a wall open to the exterior of said cutterhead; and further including angle changing means, located between said wall of said slot and at least one of said long flat sides of said blade, for changing said first predetermined angle and said second predetermined angle.

25. A planer cutting tool for blades having two parallel spaced apart flat sides, a flat straight base between the sides, two opposite ends which are generally perpendicular to the base and the sides, and a straight flat bevelled cutting edge which is included at an angle to the base, comprising:
 (a) a cutterhead having an axis of revolution; and
 (b) holding means, carried by said cutterhead, for holding thereon a plurality of blades to have the cutting edge of each blade present a predetermined range of cutting angles to the workpiece and to have one end of the cutting edge of said blade located substantially at the sam distance from said axis as an opposite end of the blade.

26. In a wood planer, apparatus comprising:
 (a) a generally cylindrical cutterhead having an axis of revolution, an outer surface and no more than four elongated blade slots in said surface, each of said slot having a bottom wall means and a side wall means which are inclined angles to set of mutually perpendicular planes which define said axis, said side wall means comprising a generally flat fixed wall formed into said cutterhead and removable shimming means, said shimming means having a substantially flat cutterhead wall disposed against said fixed wall and a substantially flat blade wall which is located opposite to said cutter wall; and
 (b) means, carried by said cutterhead, for holding a blade in a blade slot and for aligning said blade relative to said outer surface to have the cutting edge of said blade lie at the intersection of two flat planes which are perpendicular to each other and which are inclined at an acute angle to two flat mutually perpendicular planes defining said axis of revolution, and to have one end of said cutting edge located substantially at the same distance from said axis as an opposite end of said cutting edge.

27. The apparatus of claim 26, wherein said blade is a flat generally rectangular cutting blade having two parallel spaced apart flat sides, a flat straight base between said sides, two opposite flat ends which are generally perpendicular to said base and said sides, and a straight flat bevelled cutting edge; and wherein said cutting edge of said blade is positioned to present a predetermined range of cutting angles to the workpiece.

28. A planer, comprising:

(a) a cutterhead having an axis of rotation and at least one axially inclined cavity; and
(b) straight edged blade means having two flat generally parallel sides, a bottom end which is generally flat and which is perpendicular to said sides and a generally flat bevelled upper surface which is disposed between said sides, one of said sides and said bevelled surface defining a straight cutting edge; and
(c) holding and shimming means carried in said cutterhead for holding said blade means in said cavity of said cutterhead to have said sides of said blade at an acute angle relative to a plane containing said axis of rotation, to have one end of said cutting edge at a first predetermined cutting angle and an opposite end of said cutting edge at a second predetermined cutting angle, and to have said one end located at generally the same distance from said axis of rotation as said opposite end.

29. A cutterhead adapted to use a generally flat cutting blade having a straight leading edge defined by two flat intersecting planes, comprising:
(a) a drum having at least one elongated cavity along the periphery of said drum and having an axis of rotation; and
(b) means for removably holding and incrementally positioning one blade in said cavity of said drum to have opposite ends of the straight leading edge project beyond said periphery of said drum at generally the same distance from said axis, and to have the leading edge lie along an intersection of two flat planes which are inclined at acute angles to said axis of rotation.

30. A method of using a straight edged planer blade to reduce noise and improve wood working quality for a range of hardwoods, comprising the steps of:
(a) locating in a generally cylindrical drum a plurality of axially inclined walls which are inclined at a first acute angle;
(b) locating, relative to each of said walls, a plurality of straight edged cutting blades in at least two rows at each end of the drum with each blade in each row off-set from the blades in the other rows and with adjacent ends of each blade row overlapping each other;
(c) adding at least one wedge-shaped shim between each blade and one of said walls;
(d) positioning the cutting edge of each blade at a position defined by two mutually perpendicular planes which are inclined at an angle relative to the axis of rotation of the cutterhead such that one end of the blade is inclined at a first predetermined cutting angle; and
(e) fixing the height of said blade relative to said cutterhead such that said one end is approximately at the same distance from the axis of said cutterhead as said opposite end.

31. In a wood planer, apparatus comprising:
(a) a generally cylindrical cutterhead having an axis of revolution, an outer surface and at least one generally elongated slot in said surface, said slot having a bottom and one long wall joined to said bottom, said one long wall of said slot being defined by a flat plane which is inclined at acute angle relative to a flat plane which contains said axis;
(b) a flat cutting blade adapted to fit within said slot and against said one long wall, said blade having two parallel spaced apart flat sides, a flat base between said sides, two opposite ends which are generally perpendicular to said base and said sides, and a straight flat bevelled cutting edge which is located opposite to said base;
(c) alignment and holding means, carried by said cutterhead, for holding said blade in said cutterhead against said one long wall of said slot and for aligning said blade relative to said outer surface to have one end of said cutting edge present a first predetermined cutting angle and an opposite end of said cutting edge present a second predetermined cutting angle which is greater than said first predetermined cutting angle and to have said one end of said cutting edge located substantially at the same distance from said axis a said opposite end of said cutting edge; and
(d) angle changing means, disposed between at least one of said sides of said blade and at least one of said alignment and holding means and said long wall of said slot, for changing said first predetermined cutting angle and said second predetermined cutting angle by at least a predetermined increment.

32. In a wood planer, apparatus comprising:
(a) a generally cylindrical cutterhead having an axis of revolution, an outer surface and a plurality of evenly spaced generally rectangular slots in said surface, the axis of each slot being inclined at an acute angle to a first flat plane containing said axis of revolution, said slots having two long generally flat interior walls which are inclined at said acute angle and a bottom wall which together define an outwardly converging cross section that is wider at the interior of said cutterhead than at the outer surface of said cutterhead, said bottom wall being generally parallel to a second flat plane containing said axis of revolution;
(b) a flat cutting blade for each slot, each blade having two parallel spaced apart flat sides, a flat straight base between said sides, two opposite flat ends joined to said base and said sides, and a straight flat bevelled cutting edge which is located opposite said base;
(c) filling means, fitting together with each blade, for substantially filling each slot such that said blade and said wedge means have substantially the same cross section as said slot, said filling means comprising: a gib which is located adjacent one of said long walls, and shimming means, on at least one side of said blade, for changing the position of said blade relative to at least one long wall of said slot;
(d) alignment means, carried by said cutterhead adjacent said bottom of each slot, for aligning its blade relative to said outer surface to have one end of the cutting edge of its blade present a first predetermined cutting angle and an opposite end of the cutting edge of its blade present a second predetermined cutting angle and to have said one end of said cutting edge located substantially at the same distance from said axis of revolution as said opposite end of said cutting edge, said alignment means comprising adjustable means threaded into said cutterhead at opposite ends of said bottom of each slot for raising and lowering the base of its blade relative to said outer surface of said cutterhead;
(e) means, carried by the planer, for establishing the radial position of said one end and said opposite end of said cutting edge of each blade, such that one end of the cutting edge of each blade is located substantially at the same distance from said axis of revolution as the opposite end of the cutting edge; and (f) threaded means, carried by said cutterhead adjacent each slot, for holding said blade and its gib and its shimming means in that slot.

33. A planer, comprising:
(a) a cutterhead having an axis of rotation and at least one axially inclined cavity; and
(b) straight edged blade means having two flat generally parallel sides, a bottom end which is generally flat and which is perpendicular to said sides and a generally flat bevelled upper surface which is disposed between said sides, on of said sides and said bevelled surface defining a straight cutting edge;
(c) holding means, carried by said cutterhead, for holding said blade means in said cavity of said cutterhead to have said sides of said blade at an acute angle relative to a plane containing said axis of rotation, to have one end of said cutting edge at a first predetermined cutting angle and an opposite end of said cutting edge at a second predetermined cutting angle, and to have said one end located at generally the same distance from said axis of rotation as said opposite end;
(d) shimming means, on at least one side of said blade for changing the position of said blade relative to at least one such of said long walls of said slot such that said first predetermined cutting angle is increased and said second predetermined cutting angle is increased; and
(e) a gib, fitting together with said blade and said shimming means, for substantially filling each slot.

34. A cutterhead adapted to use a generally flat cutting blade having a straight leading edge defined by two flat intersecting planes, comprising:

(a) a drum having at least one elongated cavity along the periphery of said drum and having an axis of rotation; and
(b) means for removably holding one blade in said cavity drum to have opposite ends of the straight leading edge project beyond said periphery of said drum at generally the same distance from said axis, and to have the leading edge lie along an intersection of two flat planes which are inclined at acute angles to said axis of rotation, and to have said leading edge present a range of cutting angles; and
(c) angle changing means, disposed in said cavity, and at least one of the flat sides of the blade, for changing said range of the cutting angle by at least a predetermined increment.

35. A method of using a straight edged planer blade to reduce noise and improve wood working quality for a range of hardwoods, comprising the steps of:
(a) establishing in a drum a plurality of axially inclined cavities for each blade, each cavity having at least one elongated flat wall which is open to the exterior of said drum;
(b) locating in said cavities a plurality of straight edged cutting blades in at least two rows at each end of the drum with each blade in each row off-set from the blades in the other rows and with adjacent ends of each blade row overlapping each other;
(c) inserting at least one wedge-shaped shim between said flat wall and said blade;
(d) positioning the cutting edge of each blade along a line defined by two mutually perpendicular planes which ar inclined at an angle relative to the axis of rotation of the cutterhead such that one end of the blade is inclined at a first predetermined cutting angle and the opposite end of the blade is inclined at a cutting angle; and
(e) fixing the height of said blade relative to said drum such that said one end is approximately at the same distance from the axis of said cutterhead as said opposite end.

* * * * *